Figure 1:
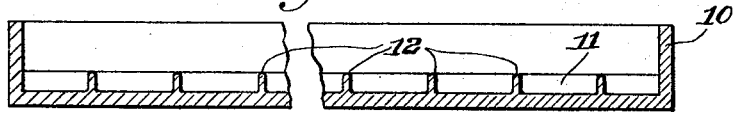

Dec. 30, 1924. 1,520,878

H. E. MARKS

METHOD OF FORMING REENFORCED CEMENTITIOUS SLABS

Filed Feb. 14, 1924

WITNESSES
A. B. Wallace
C. R. Halbert

INVENTOR
Herbert E. Marks
By Winter & Brown
his attys.

Patented Dec. 30, 1924.

1,520,878

UNITED STATES PATENT OFFICE.

HERBERT E. MARKS, OF GLEN OSBORNE, PENNSYLVANIA.

METHOD OF FORMING REENFORCED CEMENTITIOUS SLABS.

Application filed February 14, 1924. Serial No. 692,681.

*To all whom it may concern:*

Be it known that I, HERBERT E. MARKS, a citizen of the United States, and a resident of Glen Osborne, in the county of Allegheny and State of Pennsylvania, have invented a new and useful Improvement in Methods of Forming Reenforced Cementitious Slabs, of which the following is a specification.

The invention relates to a method of applying metallic reinforcements to cementitious slabs. Its object is to provide for the more accurate positioning of the reinforcement relative to the surfaces of the slab.

In fireproof roof and floor construction it is quite common to use what are known as pre-cast cementitious slabs which generally are reenforced by metallic rods, wires or mesh in order to strengthen the same. In making these slabs the metallic reinforcement is placed in the mold, suitably spaced from the bottom of it, and the cementitious material is then poured into the mold and allowed to set. This method is objectionable because it is difficult to hold the reinforcement in proper position in the mold so that in the finished slab it will lie uniformly spaced from the tension side of the slab.

The present invention is designed to overcome this difficulty, and provide a method of forming such slabs that the metallic reinforcement will be uniformly spaced, and at the best distance from the tension side of the slab. This object is secured by providing the cast slab, on its lower or tension side with grooves to receive the metallic reinforcement, which grooves are formed of exactly the right depth and of uniform depth, to space the reinforcement the proper distance from the tension side of the slab. After being so formed the slab is placed with its grooved side on top, the metallic reinforcement is laid into the grooves and down in the bottoms of them, after which the grooves are filled with cementitious material of the same kind as the body of the slab, or of a kind sufficiently similar to it to thoroughly bond with the material of the body of the slab and form a homogeneous part thereof. The result is that the reinforcement is thoroughly embedded in the slab, is uniformly spaced from the tension side thereof, and can be spaced from said tension surface at such distance as to get the most effective reinforcement for the slab.

The invention can be applied to any cementitious slab. With certain materials, which form a very strong bond with the metallic reinforcement, it is necessary to provide only longitudinal grooves to receive longitudinal reinforcing members, but with materials such as gypsum, which do not form such a strong bond with the metallic members, it is desirable to provide the slab with transverse grooves or at least transverse portions of grooves, in addition to the longitudinal grooves, and provide the reinforcement with transverse rods or wires, or at least transverse projections, which lie or extend into the transverse grooves or transverse extensions of the grooves and abut against the walls of said transverse grooves or portions of grooves, and therefore transmit the strains on the longitudinal members directly to the body of the cementitious slab.

The invention can be carried out in various ways, such as casting the slabs with flat faces, and then forming grooves, either longitudinal or both longitudinal or transverse, by suitable grinding wheels or other tools; or forming the grooves in the slab in the process of molding it. The longitudinal grooves can be formed by extruding the material through a suitable die provided with portions which will form such grooves in a well known manner, and if the slab is to have only longitudinal reinforcing members, this will suffice; and if it is to be reenforced both longitudinally and transversely, the transverse grooves can afterwards be formed by a grinding wheel, or other tool. Another way is to form the grooves, either longitudinal or both longitudinal and transverse, by suitable projections in the bottom of the mold. Whichever method is followed, a slab after being formed with the desired grooves, is placed with the groove face on top, and the metallic reinforcement then placed in and embedded in it as hereinbefore described.

The reinforcement may be of various forms, but the preferred form of such reinforcement, particularly for gypsum slabs will be a welded metallic mesh, comprising longitudinal wires and transverse wires welded at their crossing points, this form of reinforcement being preferred because of the ability to tie the projecting ends of such reinforcement of contiguous slabs together.

Figure 3:
Figure 2:
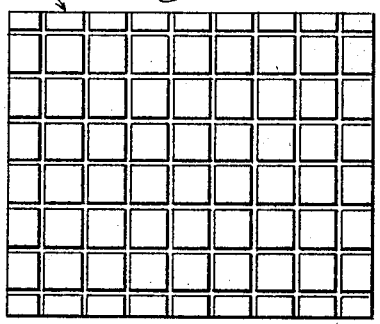
Figure 4:
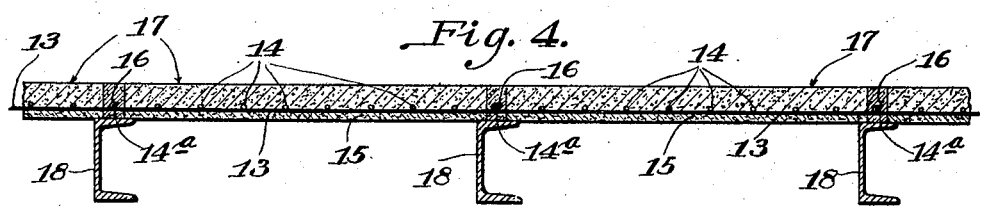

In the accompanying drawings is illustrated one way of forming a slab having the preferred form of reinforcement, and various forms of modifications. In said drawings Fig. 1 is a sectional view through a mold for forming a slab with both longitudinal and transverse grooves; Fig. 2 is a plan view showing the underface of the molded slab; Fig. 3 is a sectional view of the slab with the preferred form of reinforcement applied thereto; Fig. 4 is a sectional view showing such slabs placed in position with the reinforcements at adjacent ends of contiguous slabs joined in order to form a continuous reinforcement; and Figs. 5, 6, 7 and 8 are detail views showing modifications.

As shown in Fig. 1, the mold 10 is provided on its bottom with longitudinal ribs 11 and transverse ribs 12, of a width and height necessary to form grooves of the necessary width and height. The cementitious material is poured into this mold in the usual way, and mainfestly the slab formed in it will be provided with longitudinal and transverse grooves of a width and depth corresponding to the ribs 11 and 12. After the slab is set it is removed from the mold, turned up-side-down, that is, with its grooved face on top, and then the reinforcing mesh is placed in said grooves, with the members of it lying in the bottom of the grooves, after which the grooves are filled with cementitious material of the same or similar kind to thoroughly and homogeneously bond with the body of the slab. As shown in Figs. 2 and 4 the reinforcement comprises the longitudinal wires 13 and transverse wires 14, welded together at their crossing points and forming meshes of the same dimension as the squares or rectangles formed by the cross grooves in the slab. The cementitious filling material is shown at 15. After this has been filled in and thoroughly set, the reinforcement is thoroughly embedded in the slab, and is spaced uniformly from the tension side of the slab. Manifestly the grooves can be formed of exactly the right depth for any particular slab so that the reinforcement will be spaced the most effective distance from the tension surface of the slab.

In this preferred form the metallic mesh will be so arranged that one of the transverse wires, such as 14$^a$, will lie slightly beyond one end of the slab, while at the other end the longitudinal wires 13 will be formed into the hooks or the like 16 which can be made to engage with the transverse wire 14$^a$ of the adjacent end of the contiguous slab, such as shown in Fig. 4, where the slabs 17 are of a length to bridge the space between roof or floor supporting members or beams 18, with the reinforcement of adjacent members joined above said beams, as shown, after which the space between said ends will be filled with grouting, thus forming a roof or floor having substantially continuous reinforcement.

Manifestly instead of molding the slabs with the crossed grooves as illustrated, these grooves can be ground or otherwise cut into the slab by any suitable grinding wheel or tool after the slab is formed; or the longitudinal grooves can be formed by extruding through a properly shaped die, and afterwards the transverse grooves ground or cut in the slab.

Figure 5:

Also instead of using welded metallic mesh as shown in Figs. 3 and 4, any other suitable mesh may be employed, such as that illustrated in Fig. 5, where the longitudinal members or wires 13$^a$ are formed with loops or eyes 19 through which are threaded the transverse wires or members 14$^b$; or any other form of mesh in which the transverse wires are held against longitudinal movement relative to the longitudinal wires may be employed.

Figure 7:
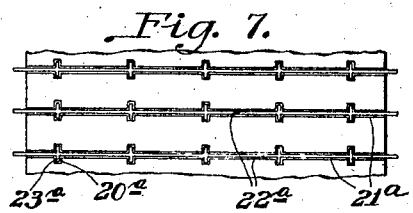
Figure 6:
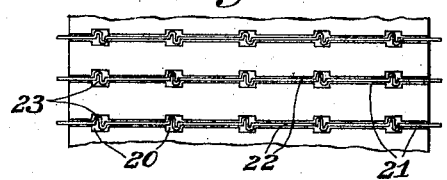
Figure 8:
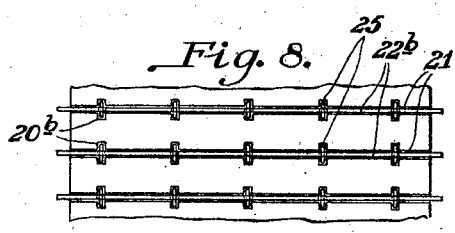

It is not necessary to have continuous transverse grooves and continuous transverse reinforcing members. For instance, the transverse grooves may be merely extensions or enlargements 20 or 20$^a$, of the longitudinal grooves 21 or 21$^a$, as shown in Figs. 6 and 7, and in this case the longitudinal reinforcing member 22 or 22$^a$ may be provided with laterally bent or loop portions 23 as shown in Fig. 6, or transverse portions 23$^a$ formed by upsetting the longitudinal members, as shown in Fig. 7, and which lateral bends, loops or projections extend into the transverse extensions 20 or 20$^a$ of the grooves, and thus serve to more thoroughly anchor the longitudinal member in the cementitious body. Another form is shown in Fig. 8, where the longitudinal groove is also provided with the transverse extensions 20$^b$, and the longitudinal member is in the form of a strip 22$^b$ punched with holes at suitable distances apart, through which are inserted pins or the like 25 which project into the lateral extensions 20$^b$ of the groove.

In all of these forms the continuous transverse wire, or the shorter transverse projecting portions of the longitudinal reinforcing members serve to transmit the strains on the longitudinal members directly to the body of the cementitious material, and some such form is necessary or at least desirable when the slabs are formed of gypsum or like material which does not very strongly bond to the metallic reinforcing members. With other materials, such as cement, which form a stronger bond with the metallic reinforcement, simple longitudinal grooves with longitudinal reinforcement members either plain or deformed grouted in the longitudinal grooves of the slab, will suffice. Various other modifications either in the manner of forming the grooves or in the form and arrangement of the grooves and reinforcement members will readily suggest themselves to persons skilled in the art.

I claim:

1. The method of forming reenforced cementitious slabs which consists in forming a cementitious slab with grooves in its tension face, inserting reinforcing members in said grooves, and filling the grooves with a cementitious material that will bond with the material of the slab.

2. The method of forming reenforced cementitious slabs which consists in forming a cast cementitious slab with grooves in its tension face, placing said slab with its grooved face on top, laying a metallic reinforcement in said grooves, and then filling said grooves with cementitious material of a kind to bond with the material of the slab.

3. The method of forming reenforced cementitious slabs which consists in forming a cast cementitious slab on its tension side with longitudinal grooves and transverse extensions thereof, placing said slab with its grooved face on top, laying in said grooves metallic reinforcement comprising longitudinal members provided with transverse portions extending into the transverse extensions of the grooves, and then filling said grooves with cementitious material of a kind to bond with the material of the slab.

4. The method of forming reenforced cementitious slabs which consists in forming a cast cementitious slab on its tension side with longitudinal and transverse grooves, laying in said grooves metallic reinforcing mesh comprising longitudinal and transverse members, and then filling the said grooves with cementitious material of a kind to bond with the material of the slab.

In testimony whereof, I sign my name.

HERBERT E. MARKS.

Witness:
EDWIN O. JOHNS.